United States Patent [19]

Ross et al.

[11] Patent Number: 4,556,550

[45] Date of Patent: Dec. 3, 1985

[54] PROCESS FOR THE PREPARATION OF HIGH-LEVEL ION-EXCHANGED FORMS OF ZEOLITES F AND ZEOLITE W

[75] Inventors: Ronald J. Ross, Upper Nyack; John D. Sherman, Chappaqua, both of N.Y.

[73] Assignee: Union Carbide Corporation, Danbury, Conn.

[21] Appl. No.: 543,360

[22] Filed: Oct. 19, 1983

[51] Int. Cl.$^4$ ................................................ C01C 3/00
[52] U.S. Cl. .................................. 423/328; 423/331; 423/332; 502/85; 502/86
[58] Field of Search .................. 423/328, 331, 332; 502/85, 86

[56] References Cited

U.S. PATENT DOCUMENTS

| | | | |
|---|---|---|---|
| 2,996,358 | 8/1961 | Milton | 423/328 |
| 3,012,853 | 12/1961 | Milton | 23/113 |
| 3,503,901 | 3/1970 | Rickert | 252/455 |
| 3,723,308 | 3/1973 | Breck | 210/38 |
| 3,732,326 | 5/1973 | Chen | 260/676 MS |
| 3,985,859 | 10/1976 | Blaine | 423/328 |
| 4,122,007 | 10/1978 | Yamamoto et al. | 210/32 |
| 4,344,851 | 8/1982 | Sherman et al. | 210/670 |

*Primary Examiner*—John Doll
*Assistant Examiner*—Jackson Leeds
*Attorney, Agent, or Firm*—Gary L. Wamer

[57] ABSTRACT

A process is provided for achieving a high degree of exchange for zeolites, e.g., Zeolites F and W. After preparation of the ammonium form, the zeolite is contacted with a solution containing the desired metal cation while simultaneously maintaining the pH at between about 9.0 and 12.0 to provide a final product zeolite wherein the desired metal cation will correspond to at least about 0.5 of the total zeolitic cations.

7 Claims, No Drawings

PROCESS FOR THE PREPARATION OF HIGH-LEVEL ION-EXCHANGED FORMS OF ZEOLITES F AND ZEOLITE W

FIELD OF THE INVENTION

The instant process relates to the preparation of zeolites having a high level of cation exchange with cations of zeolitic cations which are unfavorably ion exchanged with the starting zeolitic materials.

BACKGROUND

The ion-exchange of zeolites is well known in the art relating to zeolites. As equally well known is the difficulty of ion-exchanging certain zeolites with certain cations. Although the as-synthesized form of a given zeolite may have many uses, the ultimate use of a zeolite may be dependent on the ability to transform the as-synthesized zeolite to another form wherein at least a major portion of the zeolitic cations of the as-synthesized zeolite have been exchanged for another cation(s).

Unfortunately the cation exchange of certain zeolites, such as zeolites W and F, with specific cations is extremely difficult. For example, the as-prepared form of Zeolite W is generally associated with $K^+$ cations when synthesized and Zeolite F is generally associated with $K^+$ when synthesized. For many uses these cation forms of Zeolite W and Zeolite F are not acceptable and, accordingly, if such are to be employed in such uses they must be exchanged with a more acceptable cation.

The use of multi-step ion-exchange for ZSM-type zeolites and Zeolite Y is disclosed in U.S. Pat. Nos. 3,732,326 and 3,503,901, respectively. These patents employed a simple two step ion exchange procedure wherein the ZSM-type zeolite and zeolite Y were exchanged with NH$_4$Cl and then exchanged with $Zn^{++}$ and $Mn^{++}$, respectively. The relatively favorable nature of the exchange of these materials makes the exchange of these materials amenable to being carried out by use of relatively simple procedures, i.e., "by ion exchange with the non-metal cations using, for example, water soluble salts of the desired metal." (See: U.S. Pat. No. 3,503,901, column 4, lines 7 to 9).

The difficulties encountered in the cation exchange of certain zeolites when a desired cation is not as favorably accepted by the zeolite as the initial cation possessed by the zeolite are readily apparent when certain cation forms of zeolite F and zeolite W are to be prepared. Due to the nature of Zeolite F and Zeolite W the cation exchange of certain zeolitic cations associated therewith are not facilitated with the same ease as exchange for ZSM-type zeolites and zeolite Y. In U.S. Pat. No. 3,723,308 it is disclosed that zeolite F may be treated with a saturated calcium hydroxide solution which ". . . is effective in removing exchanged ammonium ion, even though the zeolite is capable of selectively imbibing the ammonium ion from a solution containing approximately equal amounts of ammonium and calcium ions." This preference for ammonium ions over calcium ions must be overcome if a high-level of $Ca^{++}$ ion-exchange is to be achieved. The difficult nature of the exchange of an ammonium-exchange zeolite F with metal cations is exemplified by Example III of U.S. Pat. No. 3,723,308 wherein for an ammonium-exchanged Zeolite F only 33 percent of the ammonium ions were exchanged after regeneration. This low level of ion exchange for the ammonium ion is generally too low to be satisfactory for many uses where the presence of ammonium ions is a concern. Thus, except for uses such as waste water treatment and the like, a different method for treating Zeolite F must be employed wherein the unfavorable exchange of ammonium or other unfavorably exchanged cations will be facilitated.

Further, the exchange of Zeolite W with monovalent and divalent cations is disclosed in U.S. Pat. No. 3,012,853. The exchange of Zeolite W is disclosed as being effected by treatment of Zeolite W with a salt solution of the desired cation. The problems associated with such a procedure with respect to the exchange of specific cations is evident from a consideration of Table III of the patent. The treatment of the zeolite with a salt solution of calcium gave only an exchange of 52 percent and for lithium the exchange was only 22.6 percent. Since a high-level $Ca^{++}$ exchange of the potassium form of Zeolite W may be the only suitable form for some uses of Zeolite W some method must be employed to increase the total percentage that calcium cations form of the total cations present in Zeolite W.

The use of a $Na_2CO_3$/NaOH solution at a pH of $11.0 \pm 1.0$ in a reclaiming process for crystalline zeolites, is disclosed in U.S. Pat. No. 4,122,007. This process is related to the sodium exchange of crystalline zeolites containing some ammonium cation. For the most part the crystalline zeolites reclaimed in this process contained alkali metal in the as-synthesized form and as a result had a high affinity for sodium cations. Thus, the process did not necessarily have to overcome an unfavorable exchange of the enchanged cation by the sodium cation.

The reaction of ammonium ions with a basic media to form ammonia is a know process and has been employed with clinoptilolite in the ammonium form to provide hydroxyl groups to clinoptilolite. The use of an alkaline regenerant solution is disclosed in U.S. patent application Ser. No. B 485,401 for regeneration of ammonium containing zeolites with sodium or calcium ions with regeneration of the ammonium ions to ammonia.

SUMMARY OF THE INVENTION

This invention relates to a process for affecting a high-level of exchange of zeolites containing an initial cation, "$M_i$", with cations, "$M_f$", which are otherwise difficult to provide to such zeolites by ion exchange wherein the process comprises:

(a) contacting a zeolite having an initial metal cation "$M_i$" with a solution containing between about 100 meq/l (milliequivalents/liter) and about 2000 meq/l of ammonium ions for a time sufficient to provide a molar ratio of $(NH_4)_2O$ to $Al_2O_3$ of at least 0.80;

(b) contacting the product of (a) with a solution of the cation $M_f$ where the selectivity factor ($SF_f$) of the zeolite for the final cation ($M_f$) over the initial cation ($M_i$) is less than 0.5 and wherein such cation $M_f$ is at a concentration between about 100 meq/l and about 2000 meq/l while the pH of such aqueous solution is maintained between about 9.0 and about 12.0 for a time sufficient to provide a zeolite slurry with a molar ratio of $M_fO/Al_2O_3$ of at least 0.7 and a molar ratio of $(NH_4)_2O$ to $Al_2O_3$ less than 0.1;

(c) obtaining a zeolite product from step (b); and, optionally, (d) washing the zeolite product with a wash solution containing the cation $M_f$.

The process provides for a high-level of exchange of the zeolite with cation $M_f$ with very low unexchanged $NH_4^+$ being present in the final zeolite product. The process is particularly well suited for preparing certain cationic forms of zeolites F and W.

DETAILED DESCRIPTION

The instant process relates to a process for the preparation high-level exchanged zeolites with cation which are unfavorably exchanged with such zeolites such that the final exchanged zeolite product contains a higher concentration, i.e., a greater number of the zeolite cations, of a metal cation(s) which heretofore has been difficult to provide at such high concentrations to such zeolite.

This process has significant value in the preparation of specific cation-exchanged forms of zeolites which have been heretofore difficult to prepare, such as zeolites F and W. Such zeolites have heretofore been very difficult and expensive to prepare in certain cation forms. In general this results from the fact that a desired cation exchange is very unfavorable, i.e., the cation form of the zeolite in the as-synthesized form (containing $M_i$) is greatly preferred over the cation form of the zeolite which is to be formed as a result of the cation exchange (containing $M_f$). Typical of such preparative problems is the preparation of the sodium ($Na^+$) and other cation forms of zeolite W which are very difficult to prepare from the as-synthesized potassium ($K^+$) form because $K^+$ is more strongly held by the zeolite than is $Na^+$. Similarly, the $Ca^{++}$ and other forms of zeolite F are difficult to prepare from the as-synthesized $K^+$ form of zeolite F because $K^+$ is more strongly held than $Ca^{++}$.

Since it may often be desirable to exchange the cation in the as-synthesized form of a zeolite or prepare a mixed-cation-exchanged form, in which one or more of the cations desired to be exchanged with the zeolite is less preferred by the zeolite than the initial cation present in the as-synthesized zeolite, the preference of the zeolite for cation present in the as-synthesized form of the zeolite must be overcome. The present process overcomes the preference that the zeolite has for the initial as-synthesized cation ($M_i$) and provides a process for providing exchanged zeolites, e.g., F or W, wherein the concentration of the desired cation ($M_f$) is provided in the final zeolite product.

The instant process comprises:

(a) contacting a zeolite having an initial cation $M_i$ with a solution containing between about 100 meq/l (milliequivalents/liter) and about 2000 meq/l of ammonium ions for a time sufficient to provide a molar ratio of $(NH_4)_2O$ to $Al_2O_3$ of at least 0.80;

(b) contacting the product of a) with a solution of the cation $M_f$ where the selectivity factor ($SF_f$) of the zeolite for the final cation ($M_f$) over the initial cation is less than 0.5 and wherein such cation $M_f$ is at a concentration between about 100 meq/l and about 2000 meq/l while the pH of such aqueous solution is maintained between about 9.0 and about 12.0 for a time sufficient to provide a zeolite slurry with a molar ratio of $M_fO/Al_2O_3$ of at least 0.7 and a molar ratio of $(NH_4)_2O$ to $Al_2O_3$ less than 0.1;

(c) obtaining a zeolite product from step b); and, optionally, (d) washing the zeolite product with a wash solution containing the cation $M_f$, preferably between 0.001N and about 0.75N and more preferably between about 0.01N and about 0.5N.

In addition, prior to step (c) it is often advantageous to reduce the pH of the aqueous zeolite slurry to between about 7 and about 8.

Zeolites which are employable in the instant process include any crystalline aluminosilicate which possesses a selectivity factor for the cation contained therein vs the cation to be finally contained by said zeolite of less than 0.5. Preferably such zeolites are characterized as having a selectivity factor for the final cation ($M_f$) over the initial cation ($M_i$) of less than 0.3 and most preferably less than 0.1. Zeolites which are readily employed in the instant process include Zeolite F, as described in U.S. Pat. No. 2,996,358, and Zeolite W, as described in U.S. Pat. No. 3,012,853. Zeolites F and W are generally synthesized in the potassium or sodium form, typically the potassium form, and have been found heretofore to have only limited exchangability to other cation forms.

The final cation $M_f$ that is exchanged with the selected zeolite, e.g., zeolite F or zeolite W, comprises most any cation which is less selectively sought by the zeolite as compared with than the cation initially associated with the zeolite prior to the desired exchange. This relative selectivity that the zeolite has for one cation in preference over another will be referred to herein as the "Selectivity Factor". The Selectivity Factor ($SF_f$) may be defined by:

$$SF_f = (A_s \cdot B_z / A_z \cdot B_s)$$

wherein:

$A_s$ is the equivalent fraction of exchanging cation $M_f$ in solution;

$B_z$ is the equivalent fraction of cation $M_i$ in the zeolite;

$A_z$ is the equivalent fraction of cation $M_f$ in the zeolite;

$B_s$ is the equivalent fraction of cation $M_i$ in solution.

The instant process relates to the preparation of cation forms of zeolites wherein the to be prpared cationic form is unfavorable owing to the affinity of the zeolite for the cation which must be ion exchanged if the desired cation form is to be obtained. The instant process provides a means for preparing the desired product when the Selectivity Factor is less than about 0.5, preferably less than about 0.3 and most preferably less than about 0.1.

The Selectivity Factor is a function of the zeolite, the cation(s) of interest and the composition of the solution used for the exchange. Accordingly, the Selectivity Factor is necessarily related to a specified temperature, cationic concentration, ionic composition and degree of exchange and, further, is influenced by such factors as the degree of solvation of a given cation, valence, "ion-sieve" action, and complex and precipitate formation. Since the Selectivity Factor is dependent on ionic concentration and degree of exchange, the relative selectivity may best be characterized by an isotherm plot, it being recognized that such isotheim plots are not generally linear plots and are dependent on the desired degree of exchange. The abscissa in such a plot is the equivalent fraction of a cation $M_i$ in solution, $B_s$, while the ordinate is the equivalent fraction of cation $M_i$ in the zeolite, $B_z$. The dashed line from the origin to the opposing corner with a slope of one (1), designates a Selectivity Factor of one (1). This corresponds to the condition wherein the zeolite has no preference for the cation (Mi) over the other cation(s) in the system. Above the dashed line the Selectivity Factor has a preference for the initial cation over the other cation(s) in the system. The instant process relates to the condition that exists relative to cations other than $M_i$ where cation $M_i$ is the cation associated with the zeolite sum to the ion exchange with cation $M_f$. The Selectivity Factor in the region above the dashed line defines the region where cations other than $M_i$ are present but are less preferred by the zeolite. This process provides a means for introducing such cations as a major portion, i.e., in excess of fifty (50) percent, preferably greater than seventy (70) percent, of the zeolite cations when the Selectivity Factor for the cation $M_f$ relative to the cation $M_i$ is less than 0.5, as hereinbefore described.

Thus, the instant invention provides a process wherein the unfavorable exchange of the less preferred cation may not only be accomplished but where the less preferred cation comprises at least 50 percent of the zeolitic cations and preferably at least 70 percent of the zeolite cations in the final zeolite product and often times in excess of 90 percent.

The metal cations which are selected for the purpose of exchanging the zeolite will depend in each case on the particular zeolite being ion exchanged but in every case the Selectivity Factor will be as above described. When the zeolite either before or after the desired ion exchange contains a mixture of cations the Selectivity Factor for the mixture is the sum of the equivalent fractions of the respective cations ($M_i$ or $M_f$).

Representative of the metal cations $M_f$ which fall in the above characterization for a Zeolite F in the potassium form, i.e., $M_i$ is $K^+$, are $Mg^{++}$, $Li^+$ and $Na^+$. Representative of the metal cations $M_f$ which fall in the above characterization for Zeolite W in the potassium form, i.e., $M_i$ is $K^+$, are $Ca^{++}$, $Mg^{++}$, $Na^+$, and $Li^+$.

The following examples are provided herein solely to illustrate the invention and are not to be construed as being limiting thereof:

EXAMPLE 1

An ammonium exchanged potassium Zeolite W (referred to herein as "$K_2W$") was prepared by adding 30 grams (hydrated weight) of $K_2W$ powder (Loss of Ignition) (LOI)=13.1 percent) to 2 liters of 2 Normal (N) ammonium chloride solution. The mixture was stirred for 1 hour followed by centrifugation and decantation. This procedure was repeated three times for a total of four (4) batch exchanges. After the fourth exchange, the sample was washed twice with 2 liters of 0.01N ammonium chloride solution, stirred for 5 minutes, centrifuged and decanted. This product was subject to chemical analysis and the results of this analysis are in Table I under example 1a.

In the second step, the ammonium exchanged Zeolite W was calcium exchanged as follows: a one (1) liter 2N $CaCl_2$ solution containing 1.6 grams $Ca(OH)_2$ was prepared in a nitrogen purged glove bag to prevent contact with atmospheric carbon dioxide. Thereafter, 8 grams (hydrated weight, LOI =24.5 percent) of the ammonium exchanged zeolite product prepared as above, was placed in a nitrogen purged, stirred container and the 1 liter of the $CaCl_2$ solution added. Stirring and nitrogen purging were continued for about 24 hours. The pH of the mixture was observed to be between 9.6 and 11.0 over the 24-hour period. Thereafter, the pH of the slurry was lowered to about 7 with hydrochloric acid and the mixture centrifuged and decanted. Then the sample was washed twice with 1 liter of 0.02N calcuim chloride solution, mixed 2 minutes, centrifuged and decanted. This product was subjected to chemical analysis and the results of this analysis are in Table I under example 1b.

Residual ammonium ions were removed by sodium ion exchange using 500 milliliters of 2N $CaCl_2$ solution containing 1.0 gram of $Ca(OH)_2$ and 6.2 milliliters of 1N NaOH. The above product 5 grams was placed under a nitrogen atmosphere in a stirred container and mixed with 500 milliliters of the $CaCl_2$/NaOH solution. The mixture was stirred under a nitrogen purge for about 24 hours. The pH of the slurry was then lowered to about 7 using hydrochloric acid. The slurry was centrifuged and decanted and the sample washed twice with 500 milliliters of 0.02N $CaCl_2$ solution. After mixing for 5 minutes the product was centrifuged and decanted.

Analysis of the final product is in Table 1 under example 1c.

EXAMPLE 2

Calcium-exchanged zeolite W was prepared as in example 1 by slurrying 32 pounds (dry weight) of potassium zeolite W in 50 gallons of distilled water and stirring the mixture for one hour at room temperature. The slurry was then filtered through a plate-and-frame press. A solution of 100 pounds of ammonium chloride and 100 gallons of distilled water was separately prepared and heated to room temperature. Continuous ion-exchange was begun at room temperature by contacting the damp cake in the frames of the filter press with the ammonium chloride solution at a rate of approximately 0.5 gal./min., without any recycle of solution of ammonium chloride at a flow rate of approximately 0.3 gal./min., again without recycle. Over a period of about 3 hours the temperature of the exchange solution was gradually increased to 49° C. and finally to 83° C. This step continued until about 60 gallons of the second 100 gallons remained. Thereafter, the remaining 60 gallons were recycled, at room temperature at 3 gal/min., through the press. Forty gal. of distilled water were added to the exchange solution and the recycle operation continued. A solution of 25 lb. of ammonium chloride and 50 gallons of water was prepared and added to the exchange solution; recycling continued. Thereafter, a solution of 50 lb. of ammonium chloride and 100 gallons of distilled water was prepared and passed once through the zeolite cake without recycle.

The exchanged cake was blown dry with room-temperature air. The filter press was opened and the fried cake removed from the frames.

Distilled water (90 gallons) was boiled to remove carbon dioxide and thereafter were kept under a nitrogen atmosphere to prevent re-adsorption of carbon dioxide. This distilled water was mixed with 21 lb. of reagent-grade $CaCl_2$ $2H_2$ and the resulting solution cooled to room temperature. The pH of this solution adjusted to 11.6 with $Ca(OH)_2$. This solution was then added to 16 pounds (ignited basis) of the ammonium zeolite W cake and thoroughly mixed. The mixture was then transferred to a filter press. The filtrate was collected in nitrogen purged polypropylene drums and the pH was 9.06. The pH of the filtrate was then adjusted to 11.6 with $Ca(OH)_2$ and the solution was filtered. Thereafter, the exchange solution was circulated through the filter until the pH dropped to 9.8. Adjustment of the pH of the filtrate and circulating through the filter were repeated 3 and 2 times, respectively, maintaining pH in the range about 10.8 to 11.6.

Further quantities of the exchanging solution were prepared containing 21 lb. of reagent grade $CaCl_2 \cdot 2H_2O$ in 90 gallons of boiled distilled water. The exchange step was repeated until there was no change in the pH of the filtrate. The zeolite cake was then washed with 100 gal. of $CaCl_2$ solution (5 meq./liter), dried with a nitrogen stream and removed from the filter.

Distilled water (100 gals. $CO_2$ free) was added to 539.6 gm. of NaOH followed by the addition of dissolution of 25.3 lb. of $CaCl_2 \cdot 2H_2O$. The pH of the solution was adjusted to 11.5 with $Ca(OH)_2$. This solution was cooled to room temperature and filtered. To this solution was then mixed with 19 lbs (dry wt.) of the above prepared Ca-exchanged zeolite cake (slurried in 20 gal. of the exchanging solution) and filtered on the filter press. The remaining 80 gal. of exchanging solution were passed through the filter press without recirculation. Three 100-gal. batches of wash solution (5 meq. $Ca^{++}/1$) were prepared and separately passed through the filter press. The zeolite cake in the filter press was then blown dry with nitrogen. The zeolite cake was then reslurried in 20 gal. of the wash solution. The pH of the zeolite cake slurry was adjusted to 7.6 over a 21-day period by addition of small proportions of 3.6% HCl. Thereafter, the slurry was filtered, blown dry with air and removed from the press.

The results of chemical analysis of a sample of the final product are listed in column 4 of Table I.

TABLE I

| Analysis as Reported (Wt. %) | EXAMPLE | | | |
|---|---|---|---|---|
| | 1a $(NH_4)_2W$ | 1b $CaNH_4W$ | 1c CaNaW | 2 CaNaW |
| $(NH_4)_2O$ | 11.3 | 1.6 | 0.21 | 0.44 |
| $Na_2O$ | — | — | 0.91 | 1.05 |
| $K_2O$ | 0.15 | — | 0.44 | 0.09 |
| CaO | — | 9.7 | 9.7 | 11.0 |
| $SiO_2$ | 51.0 | 46.8 | 45.1 | 44.1 |
| $Al_2O_3$ | 23.1 | 21.5 | 21.0 | 21.1 |
| Total C as $CO_3^=$ | 0.2 | 0.24 | 0.7 | 1.2 |
| $Cl^-$ | 0.12 | — | — | 0.19 |
| LOI* | 24.5 | 20.6 | 21.2 | 21.1 |
| Total | 98.75 | 98.6 | 97.9 | 98.4 |
| Mole-Ratios: | | | | |
| $(NH_4)_2O/Al_2O_3$ | 0.958 | 0.146 | 0.020 | 0.041 |
| $Na_2O/Al_2O_3$ | — | — | 0.071 | 0.082 |
| $K_2O/Al_2O_3$ | 0.007 | — | 0.023 | 0.005 |
| $CaO/Al_2O_3$** | — | 0.802 | 0.722 | 0.851 |
| $SiO_2/Al_2O_3$ | 3.8 | 3.7 | 3.6 | 3.6 |
| Meq. Ca/g. anhydrous** | — | 4.17 | 4.1 | 4.4 |

*LOI = Loss on Ignition
**$Ca^{++}$ on zeolite after subtracting $CaCO_3$ corresponding to $CO_3^=$ content.

What is claimed is:

1. The process for preparing an exchanged zeolite selected from the group consisting of zeolite W and Zeolite F comprising:
   (a) contacting said zeolite having an initial cation $M_i$ where $M_i$ is $K^+$ with a solution containing between about 100 meq/l and about 2000 meq/l of ammonium ions for a time sufficient to provide a solid product with a molar ratio of $(NH_4)_2O$ to $Al_2O_3$ of at least 0.80;
   (b) contacting the solid product of a) with a solution of the final cation $M_f$ where $M_f$ is selected as at least one of $Ca^{++}$, $Mg^{++}$, $Na^+$ and $Li^+$ wherein the cation $M_f$ is less preferred by the zeolite than $M_i$, the selectivity factory ($SF_f$) of the zeolite for the final cation ($M_f$) over the initial cation ($M_i$) is less than 0.5 and wherein such cation $M_f$ is at a concentration between about 100 meq/l and about 2000 meq./l while the pH of such aqueous solution is maintained between about 9.0 and about 12.0 for a time sufficient to provide a zeolite slurry with a molar ratio of $M_fO/Al_2O_3$ of at least 0.7 and molar ratio of $(NH_4)_2O$ to $Al_2O_3$ less than 0.1; and
   (c) obtaining a zeolite product from step b) wherein $M_f$ cations comprise at least 50 percent of the zeolite cations.

2. The process of claim 1 comprising prior to step (c) reducing the pH of the zeolite slurry of (b) to between about 7 and about 8.

3. The process of claim 1 wherein the product of (c) is washed with a solution containing cation $M_f$.

4. The process of claim 1 wherein the $SF_f$ is less than 0.3.

5. The process of claim 4 wherein the $SF_f$ is less than 0.1.

6. The process of claim 1 wherein at least 70 percent of the zeolitic cations comprise $M_f$.

7. The process of claim 1 wherein the concentration of the cation $M_f$ in the solution is between 0.001 and about 0.75.

* * * * *